US011861323B2

(12) United States Patent
Drane

(10) Patent No.: US 11,861,323 B2
(45) Date of Patent: *Jan. 2, 2024

(54) PARTIALLY AND FULLY PARALLEL NORMALISER

(71) Applicant: Imagination Technologies Limited, Kings Langley (GB)

(72) Inventor: Theo Alan Drane, London (GB)

(73) Assignee: Imagination Technologies Limited, Kings Langley (GB)

( * ) Notice: Subject to any disclaimer, the term of this patent is extended or adjusted under 35 U.S.C. 154(b) by 352 days.

This patent is subject to a terminal disclaimer.

(21) Appl. No.: 17/202,260

(22) Filed: Mar. 15, 2021

(65) Prior Publication Data

US 2021/0200511 A1 Jul. 1, 2021

Related U.S. Application Data

(63) Continuation of application No. 16/890,926, filed on Jun. 2, 2020, now Pat. No. 10,977,000, which is a continuation of application No. 16/252,367, filed on Jan. 18, 2019, now Pat. No. 10,698,655, which is a continuation of application No. 15/636,100, filed on Jun. 28, 2017, now Pat. No. 10,223,068, which is a continuation of application No. 14/576,859, filed on Dec. 19, 2014, now Pat. No. 9,703,525.

(30) Foreign Application Priority Data

Dec. 20, 2013 (GB) ...................................... 1322757

(51) Int. Cl.
*G06F 5/01* (2006.01)
*G06F 7/74* (2006.01)

(52) U.S. Cl.
CPC .................. *G06F 5/01* (2013.01); *G06F 7/74* (2013.01); *G06F 2205/003* (2013.01)

(58) Field of Classification Search
CPC ..................................... G06F 5/01; G06F 7/74
See application file for complete search history.

(56) References Cited

U.S. PATENT DOCUMENTS

| 5,923,574 | A | 7/1999 | Bechade |
| 8,244,783 | B2 | 8/2012 | Boersma et al. |
| 9,703,525 | B2 | 7/2017 | Drane |
| 10,223,068 | B2 | 3/2019 | Drane |
| 2006/0136531 | A1 | 6/2006 | Ng |
| 2006/0265439 | A1 | 11/2006 | Kaplun et al. |

(Continued)

FOREIGN PATENT DOCUMENTS

WO 98/02796 A1 1/1998

*Primary Examiner* — Michael D. Yaary
(74) *Attorney, Agent, or Firm* — Potomac Law Group, PLLC; Vincent M DeLuca

(57) ABSTRACT

Hardware logic arranged to normalise (or renormalise) an n-bit input number is described in which at least a proportion of a left shifting operation is performed in parallel with a leading zero count operation. In various embodiments the left shifting and the leading zero count are performed independently. In various other embodiments, a subset of the bits output by a leading zero counter are input to a left shifter and the output from the left shifter is input to a renormalisation block which completes the remainder of the left shifting operation independently of any further input from the leading zero counter.

13 Claims, 8 Drawing Sheets

(56) References Cited

U.S. PATENT DOCUMENTS

| | | |
|---|---|---|
| 2007/0050434 A1 | 3/2007 | Lutz et al. |
| 2008/0301209 A1* | 12/2008 | Kaplun .................... G06F 7/74 |
| | | 708/160 |
| 2012/0011182 A1 | 1/2012 | Raafat et al. |
| 2015/0178045 A1 | 6/2015 | Drane |
| 2017/0300297 A1 | 10/2017 | Drane |
| 2019/0171415 A1 | 6/2019 | Drane |

* cited by examiner

PARTIALLY AND FULLY PARALLEL NORMALISER

BACKGROUND

Normalising an n-bit binary number (where $n \geq 2$) comprises left shifting the number so that the most significant (or leading) one is in the left most position (the most significant bit, or MSB) and returning the leading zero count of the number, where 'leading zeros' are counted from the left, such that a binary number 1110 has no leading zero and a binary number 0001 has three leading zeros. There are many uses for normalising and in particular it is used in floating point arithmetic. In floating point units in processors, the operation of left shifting the significand (a number with a one in the MSB) by the exponent value is called denormalising and the subsequent operation to convert back to floating point (such that the leading one is in the MSB) is referred to as 'renormalisation'.

Normalisation (or renormalisation) is performed by performing a leading zero count and then left shifting the input n-bit number by this amount. For example, if the input number is 0001, the leading zero count would identify that there are 3 leading zeros and the subsequent left shifting operation would shift the leading one by 3 positions. The normaliser (or renormaliser) would therefore output the result 1000 and simultaneously the leading zero count of 3 (or 11 in binary).

The embodiments described below are not limited to implementations which solve any or all of the disadvantages of known normalisers and renormalisers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hardware logic arranged to normalise (or renormalise) an n-bit input number is described in which at least a proportion of a left shifting operation is performed in parallel with a leading zero count operation. In various embodiments the left shifting and the leading zero count are performed independently. In various other embodiments, a subset of the bits output by a leading zero counter are input to a left shifter and the output from the left shifter is input to a renormalisation block which completes the remainder of the left shifting operation independently of any further input from the leading zero counter.

A first aspect provides an apparatus comprising hardware logic arranged to normalise an n-bit input number, the hardware logic comprising: a leading zero counter arranged to compute a number of leading zeros in the n-bit number; and left shifting logic arranged to perform left shifting of the n-bit number, wherein at least a portion of the left shifting is performed in parallel with the computing of the number of leading zeros.

A second aspect provides a computer readable storage medium having encoded thereon computer readable program code for generating a processor comprising hardware logic arranged to normalise an n-bit input number, the hardware logic comprising: a leading zero counter arranged to compute a number of leading zeros in the n-bit number; and normalisation logic arranged to perform left shifting of the n-bit number, wherein at least a portion of the left shifting is performed in parallel with the computing of the number of leading zeros.

Further aspects include a method of normalising an input n-bit number, the method comprising: computing a number of leading zeros in the n-bit number in a leading zero counter; and left shifting of the n-bit number in left shifting logic, wherein at least a portion of the left shifting is performed in parallel with the computing of the number of leading zeros, and a computer readable storage medium having encoded thereon computer readable program code for performing this method.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
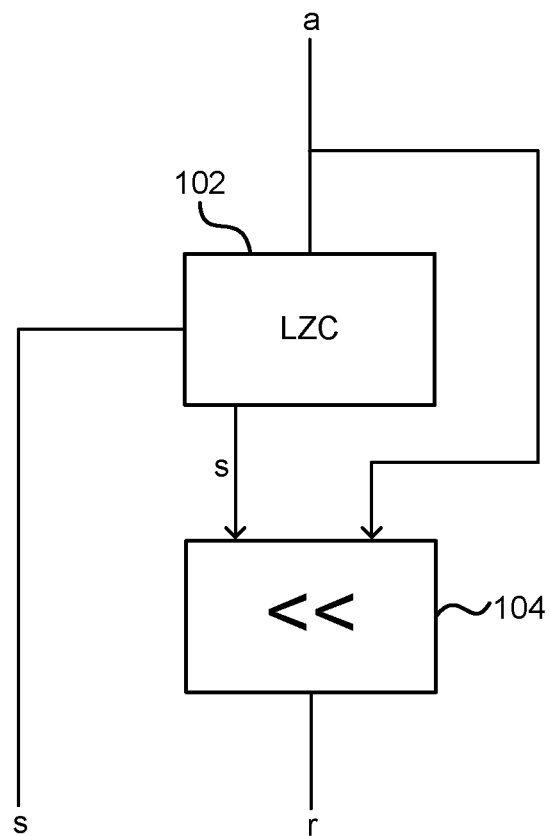
FIG. 1 is a schematic diagram of a known arrangement of hardware logic for performing normalisation.

As described above, normalisation is usually performed by passing the input number, a, through a leading zero counter (LZC) 102 and then left shifting the input number a (in a left shifter 104) by the number, s, output by the LZC 102, as shown in FIG. 1. The normalised output is denoted r. Both values r and s are output by the normalisation operation. This normalisation process can be a relatively slow operation.

In some applications, the normalisation operation may be referred to as a 'renormalisation' (e.g. within a floating point unit, following denormalisation). For the purposes of the following description the terms 'normalisation' and 'renormalisation' are considered to be equivalent and interchangeable and the methods and hardware logic described herein may be used in either normalisation or renormalisation.

Figure 2A:
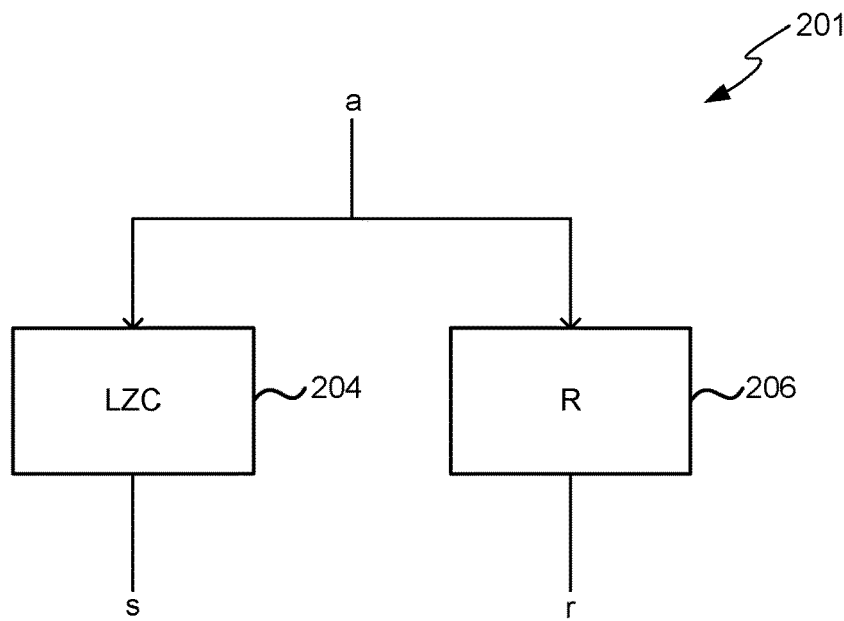
FIGS. 2A and 2B show two schematic diagrams of improved hardware logic for performing normalisation.
Figure 2B:
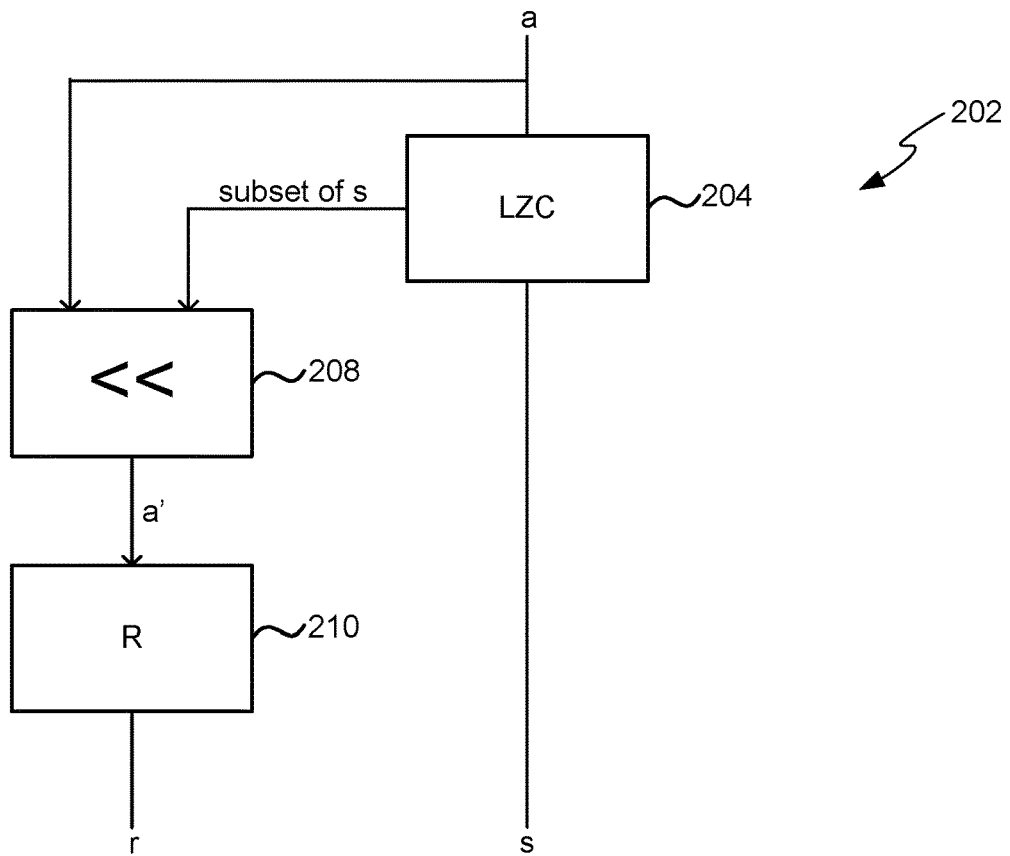

Improved hardware logic for performing normalisation is described below in which the left shifting operation starts before the completion of the leading zero count such that at least a part of the left shifting operation is performed in parallel with the leading zero count operation. Two examples 201, 202 are shown in FIG. 2. In the first example 201, the leading zero count, which is performed by LZC 204, is performed in parallel with the left shifting, which is performed by the renormaliser block 206. As shown in FIG. 2, in this example 201, the two operations, leading zero count and left shifting, are performed independently of each other to generate the two outputs r and s. In the second example 202, the left shifting operation (in left shifter 208) starts after an output has been received from the LZC 204 but before the leading zero count operation has been completed. In this example, a subset of the most significant bits (MSBs) of the LZC (i.e. the MSBs of s) are provided to the left shifter 208 and then the left shifting is completed by the renormaliser block 210. The term 'subset' is used herein to refer to a proper subset, such that a subset of the MSBs of s does not comprise all the bits of s. The hardware logic which performs the left shifting operation may be referred to as "left shifting logic". In the first example 201 this comprises the renormaliser block 206 and in the second example this comprises the left shifter 208 and the renormaliser block 210.

The MSBs of the LZC output can be computed more quickly and easily than the least significant bits (LSBs). This means that in the second example 202, the MSBs can be received quickly by the left shifter 208 and normalisation can be started before the LSBs have been computed in the LZC.

By performing at least a proportion of the leading zero count in parallel with the left shifting as described herein the hardware logic operates faster, although it may result in a larger area of hardware logic. By selecting the degree of overlap, which may be defined in terms of the number of bits, h, from the LZC that are input to the left shifter 208, the design may be arranged to satisfy particular speed and area constraints. At one extreme, as shown in the first example 201 in FIG. 2, h=0 and at the other extreme, where all but one of the bits from the output, s, of the LZC are used, $h=\lceil \log_2 n \rceil$, where n is the number of bits in the input number, a. The term h may be referred to as the hybridity and as detailed, $h \in [0, \alpha-1]$, $\alpha=\lfloor \log_2 n \rfloor +1$. The value of h is a natural number (where natural numbers are considered herein to include zero).

The first example 201 shown in FIG. 2 may be referred to as a fully parallel implementation (h=0) and this is described in detail first. The hybrid implementation, as shown in the second example 202, $(1 \leq h < \lfloor \log_2 n \rfloor +1)$ is described in detail subsequently and this description refers back to the description of the fully parallel implementation as the LZC 204 in each implementation may operate in the same way in both the fully parallel and hybrid implementations and similarly the renormaliser blocks 206, 210 may operate in a similar way (e.g. the operations of the renormaliser block 210 in the hybrid implementation may be a subset of the operations of the renormaliser block 206 in the fully para lei implementation).

The LZC 204 in the fully parallel implementation 201 may use any suitable method to compute the output, s, which is the number of leading zeros in the input number, a. In various examples, the LZC 204 may be implemented based on the following equation for calculating the bits, $s_i$, of the output, s, of the LZC 204:

$$s_i = \Sigma_{k=1}^{2^{\alpha-i-1}} B_{n-1:n-(2k-1)2^i} \overline{B_{n-(2k-1)2^i-1:n-k2^{i+1}}} \qquad (1)$$

Where:
i is the bit index for the output s and $i \in [0, \alpha-1]$
$\Sigma$ stands for a sum of OR gates
$a_m$ are the bits of the input number a, where m is the bit index and $m \in [0, n-1]$
$B_{\beta:\gamma} = \overline{a_\beta} . \overline{a_{\beta-1}} \ldots \overline{a_{\gamma+1}} . \overline{a_\gamma}$ (where . represents the AND operation)
$\overline{B_{\beta:\gamma}} = a_\beta + a_{\beta-1} + \ldots + a_{\gamma+1} + a_\gamma$ (where + represents the OR operation)
and if either (or both) of $\beta$ or $\gamma$ are negative: $B_{\beta:\gamma}=0$ and $\overline{B_{\beta:\gamma}}=1$.

Considering an example where n=8, h=0 this gives $\alpha=4$ and so the 4 bits calculated by the LZC are as follows:

$s_3 = B_{7:0}$ $s_2 = B_{7:4} \overline{B_{3:0}}$ $s_1 = B_{7:6} \overline{B_{5:4}} + B_{7:2} \overline{B_{1:0}}$ $s_0 = B_{7:7} \overline{B_{6:6}} + B_{7:5} \overline{B_{4:4}} + B_{7:3} \overline{B_{2:2}} + B_{7:1} \overline{B_{0:0}}$ Expanding these out:

$s_3 = \overline{a_7} . \overline{a_6} \ldots \overline{a_1} . \overline{a_0}$ $s_2 = \overline{a_7} . \overline{a_6} \ldots \overline{a_5} . \overline{a_4} . (a_3 + a_2 + a_1 + a_0)$ $s_1 = \overline{a_7} . \overline{a_6} . (a_5 + a_4) + \overline{a_7} . \overline{a_6} . \overline{a_5} . \overline{a_4} . \overline{a_3} . \overline{a_2} . (a_1 + a_0)$ $s_0 = \overline{a_7} . \overline{a_6} + \overline{a_7} . \overline{a_6} . \overline{a_5} . a_4 + \overline{a_7} . \overline{a_6} . \overline{a_5} . \overline{a_4} . \overline{a_3} . a_2 + \overline{a_7} . \overline{a_6} . \overline{a_5} . \overline{a_4} . \overline{a_3} . \overline{a_2} . \overline{a_1} . a_0 = ((\overline{a_7} . a_6) + (\overline{a_7} . \overline{a_6}) . (. \overline{a_5} . a_4)) + (\overline{a_7} . \overline{a_6} . \overline{a_5} . \overline{a_4}) . ((\overline{a_3} . a_2) + (\overline{a_3} . \overline{a_2}) . (\overline{a_1} . a_0))$ And so this example LZC may be implemented in the arrangements of hardware logic gates 301-304 shown in FIGS. 3 and 4.

Figure 3A:
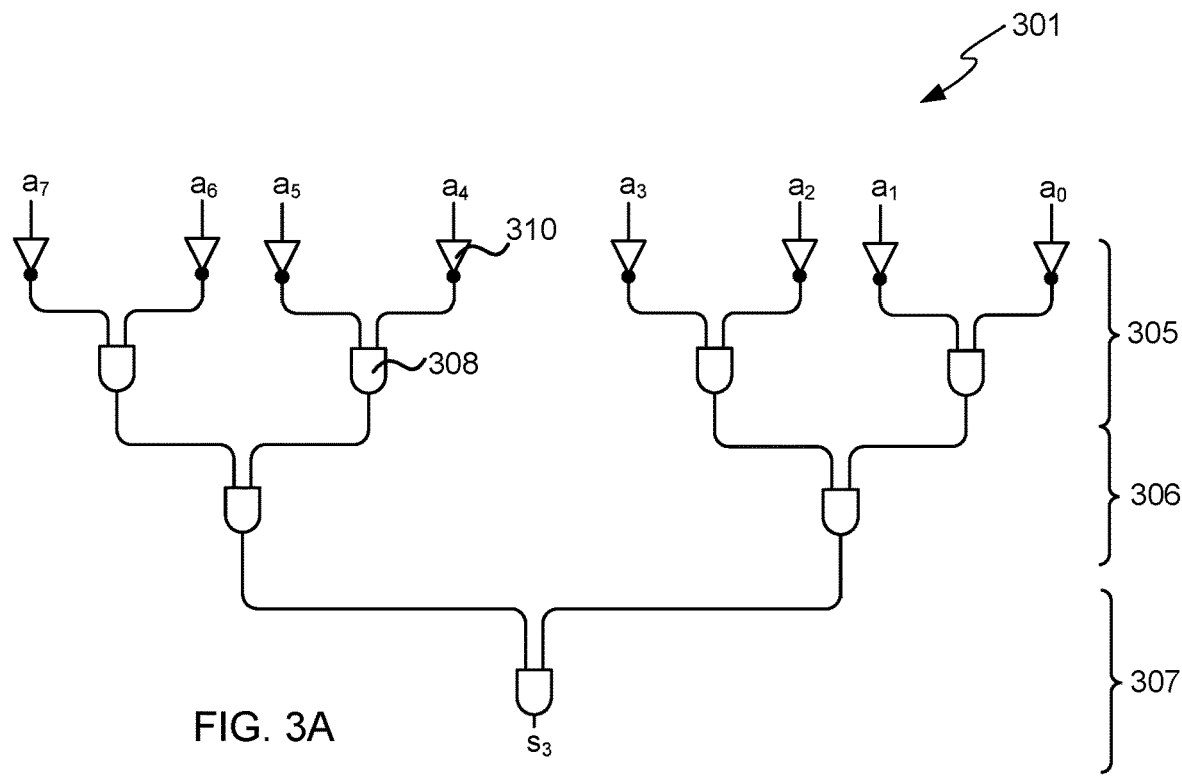
FIGS. 3A-3B and FIGS. 4A-4B show example arrangements of hardware logic which implement a leading zero counter.
Figure 3B:
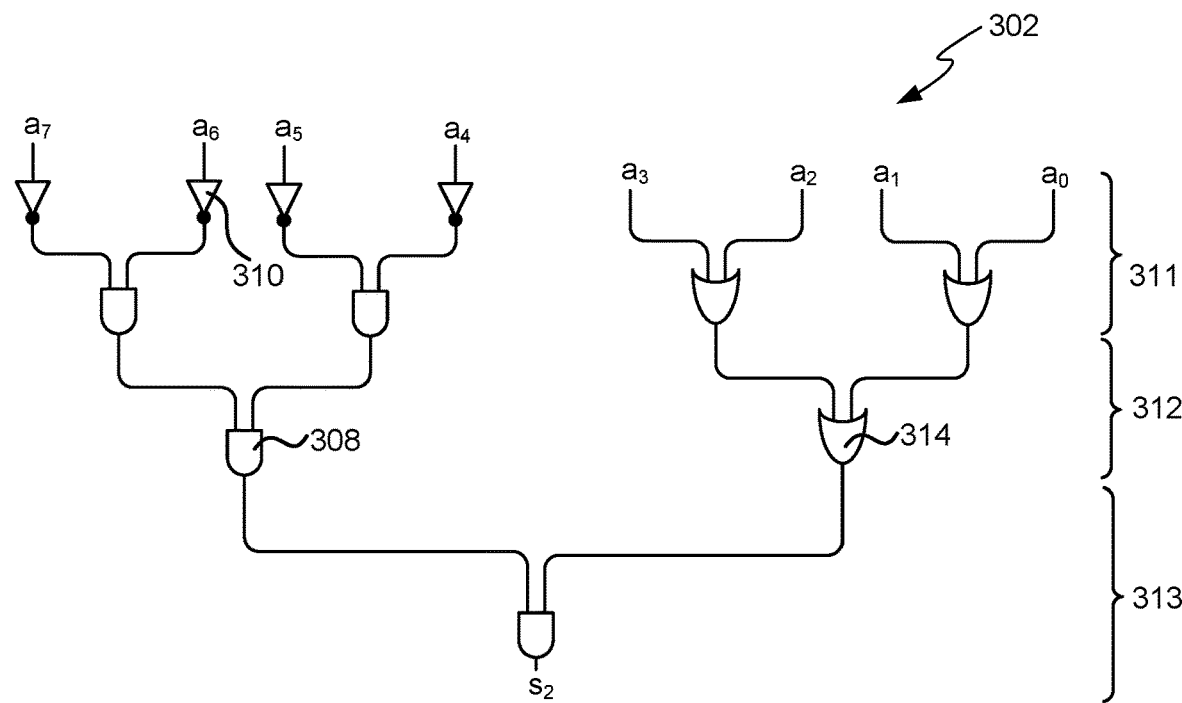

The first arrangement 301 shows an example arrangement of hardware logic gates to compute the value of $s_3$ from the 8-bit input number, a. As shown in FIG. 3, $s_3$ is calculated using three stages 305-307 of AND gates 308 and a plurality of NOT gates 310. In each stage, pairs of values from the previous stage are combined together using an AND gate 308. The NOT gates 310 are used to invert the original input bits, $a_m$.

The second arrangement 302 shows an example arrangement of hardware logic gates to compute the value of $s_2$. As shown in FIG. 3, $s_2$ is calculated using three stages 311-313 of AND gates 308 and OR gates 314 and a plurality of NOT gates 310. In each stage, pairs of values from the previous stage are combined together using an AND gate 308 or an OR gate 314. In this example, only a subset of the input bits are inverted using NOT gates 310.

Figure 4A:
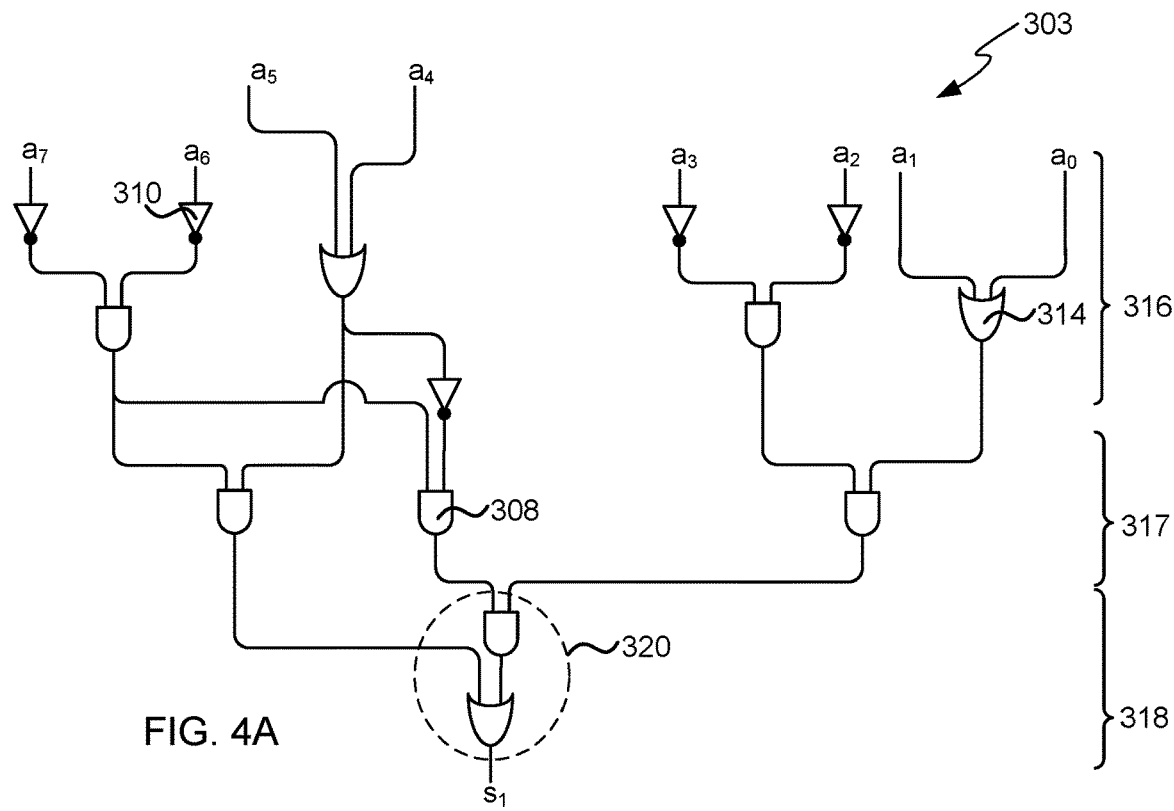
Figure 4B:
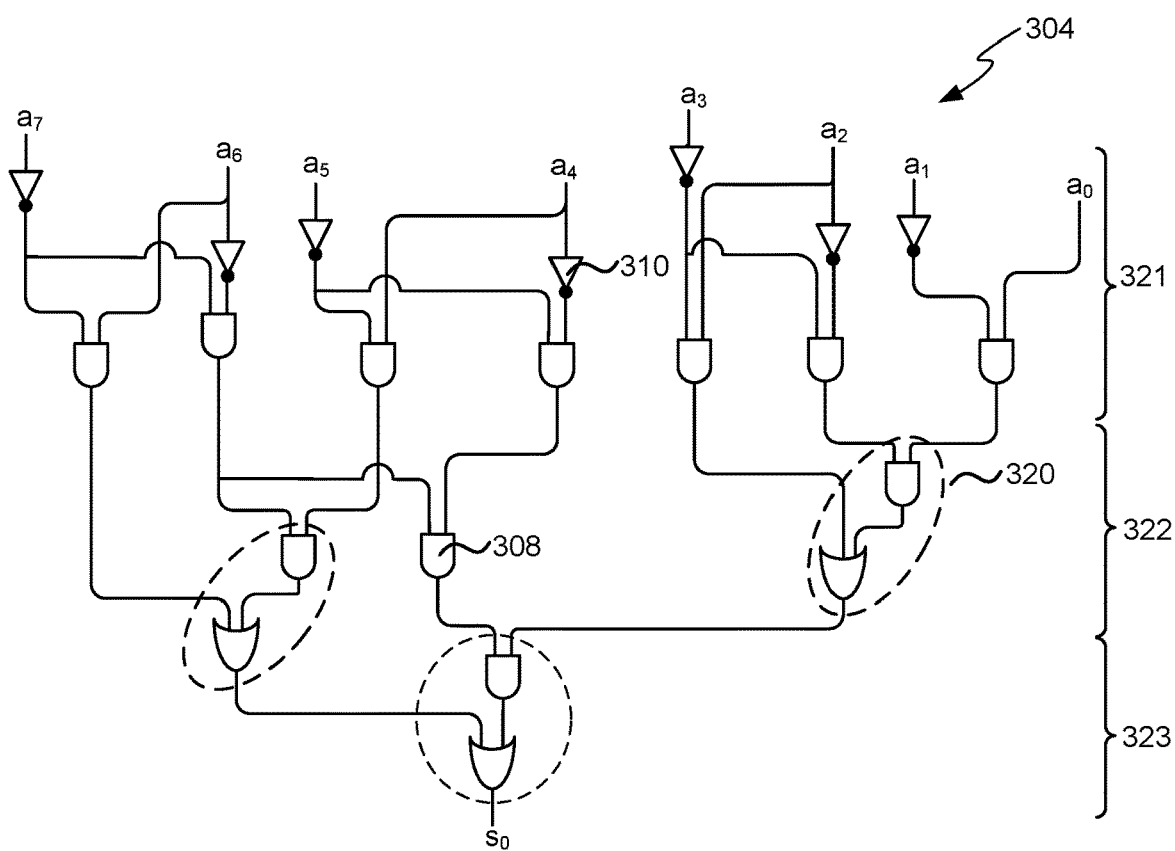

The third arrangement 303 shows an example arrangement of hardware logic gates to compute the value of $s_1$. As shown in FIG. 4, $s_1$ is calculated using three stages 316-318 of AND gates 308 and OR gates 314 and a plurality of NOT gates 310. In the first two stages 316-317, pairs of values from the previous stage are combined together using an AND gate 308 or an OR gate 314 and unlike in the previous two arrangements, in this arrangement, input bits may be used more than once. For example, in the first stage 316 input bits $a_5$ and $a_4$ are used twice, to generate both $a_5+a_4$ and $\overline{a_5}.\overline{a_4}$; however as $a_5+a_4$ and are the logical negation of each other, it is not necessary to use an OR gate to generate the first term and then two NOT gates (which may also be referred to as 'negators') and an AND gate to generate the second term. Swapping AND or OR gates for NOT gates in the hardware logic saves space (as NOT gates are smaller in size) In the second stage 317, an output from the first stage $(\overline{a_7.a_6})$ is used twice to generate both $\overline{a_7.a_6}(a_5+a_4)$ and $\overline{a_7.a_6}.\overline{a_5}.\overline{a_4}$. The final stage 318 is an AND-OR logic function 320 (which may be written AO21) and takes three inputs, combines two in an AND gate before combining the output of the AND gate and the third input in an OR gate.

The fourth arrangement 304 shows an example arrangement of hardware logic gates to compute the value of $s_0$. As shown in FIG. 4, $s_0$ is calculated using three stages 321-323 of AND gates 308 and OR gates 314 and a plurality of NOT gates 310. In the first stage 321, pairs of input bits are combined together using AND gates 308 and a plurality of NOT gates 314. Like in the third arrangement, input bits may be used more than once. In this example, both the second and third stages 322-323 involve use of AO21 logic functions 320.

Although the four arrangements 301-304 are shown totally separately in FIGS. 3 and 4 it will be appreciated that they may be combined or overlaid such that, for example, the value $\overline{a_7.a_6}$ is only calculated once and then used in each of the calculations of sit rather than this value being calculated independently many times within the hardware logic.

The renormaliser block 206 in the fully parallel implementation calculates the normalised output, r, without any input from the LZC 204, as shown in FIG. 2. In various examples, the renormaliser block 206 may be implemented based on the following equation for calculating the bits, $r_j$, of the output, r, of the renormaliser block 206:

$$r_j = A_{n-1,j} + \Sigma_{k=1}^j B_{n-1:n-k} A_{n-k-1,j-k} \quad (2)$$

Where:
j is the bit index for the normalised output, r, and $j \in [0, n-1]$ $$A_{\beta,\gamma} = a_\beta . a_\gamma$$

Considering the same example as previously where n=8, h=0, the 8 bits calculated by the renormaliser block are as follows:

$$r_0 = A_{7,0}$$

$$r_1 = A_{7,1} + B_{7:7} A_{6,0}$$

$$r_2 = A_{7,2} + B_{7:7} A_{6,1} B_{7:6} A_{5,0}$$

$$r_3 = A_{7,3} + B_{7:7} A_{6,2} B_{7:6} A_{5,1} B_{7:5} A_{4,0}$$

$$r_4 = A_{7,4} + B_{7:7} A_{6,3} B_{7:6} A_{5,2} B_{7:5} A_{4,1} B_{7:4} A_{3,0}$$

$$r_5 = A_{7,5} + B_{7:7} A_{6,4} B_{7:6} A_{5,3} B_{7:5} A_{4,2} B_{7:4} A_{3,1} B_{7:3} A_{2,1}$$

$$r_6 = A_{7,6} + B_{7:7} A_{6,5} B_{7:6} A_{5,4} B_{7:5} A_{4,3} B_{7:4} A_{3,2} B_{7:3} A_{2,1} + B_{7:2} A_{1,0}$$

$$r_7 = \overline{B_{7:0}}$$

And these may be expanded and implemented in arrangements of OR, AND, NOT and/or AO21 logic functions in a similar manner to those described above with reference to FIGS. 3 and 4. In calculating the values of $r_j$, again pairs of input bits are combined in the first stage and then groups of 2 or 3 outputs of each stage are combined in subsequent stages (e.g. where the AO21 logic function is used to combine 3 outputs).

To simplify the implementation of equation (2) above, this may be re-written in the form of a recursion relation:

$$r_i^{j:k} = r_i^{j:t} + B_{j:t} r_i^{t-1:k} \quad (3)$$

where:
i,j,k,t are indices which each have a value in the range 0 to n-1, j≥k, and k+1≥t≥j (such that 1≤t≤n-1),
$r_i^{j:k}$ is the ith output bit of the renormaliser and $B_{j:t}$ is as before, true only if $a_j, \ldots, a_t = 0$.

The indices used in equations (3) to (6) are not necessarily the same as the indices used previously (e.g. indices i and j are used earlier); however, it will be clear that where a reference is made back to one of equations (3) to (6), the indices being referred to are those used in the equations.
The value of I therefore divides a[j,k] into the two parts which may be denoted 'high' (for a[j:t]) and 'low' (for a[t-1,k]) such that equation (3) can be rewritten as:

$$r_i^{high \& low} = r_i^{high} + B_{high} r_i^{low} \quad (4)$$

Where the function $B_{high}$ is equal to one only if there are no 1s in the high part. Although the value of t may be selected arbitrarily whilst satisfying k+1≤t≤j, if t is selected to split a[j,k] into equal portions, the number of recursion steps is minimised.

Equation (3) is written in 'sum of product' form and the recursion relation may alternatively be written in 'product of sum' form as:

$$r_i^{j:k} = (r_i^{j:t} + B_{j:t})(r_i^{j:t} + r_i^{t-1:k}) \quad (5)$$

Starting from $r_i^{j:j} = A_{j,j-n+1+i}$, $r_i^{n-1:0}$ can be constructed in hardware logic in $\lfloor \log_2(i+1) \rfloor$ steps using the recursion relation (of equation (3) or (5)) to form $r_i^{j:k}$ for larger and larger intervals of [j,k] and $B_{j:k}$ can be constructed logarithmically using an AND tree. An example of this for the previously described example where n=8, i.e. for $r_i^{7:0}$, is shown in FIG. 5 and this uses the recursion shown in equation (3) above.

Figure 5:
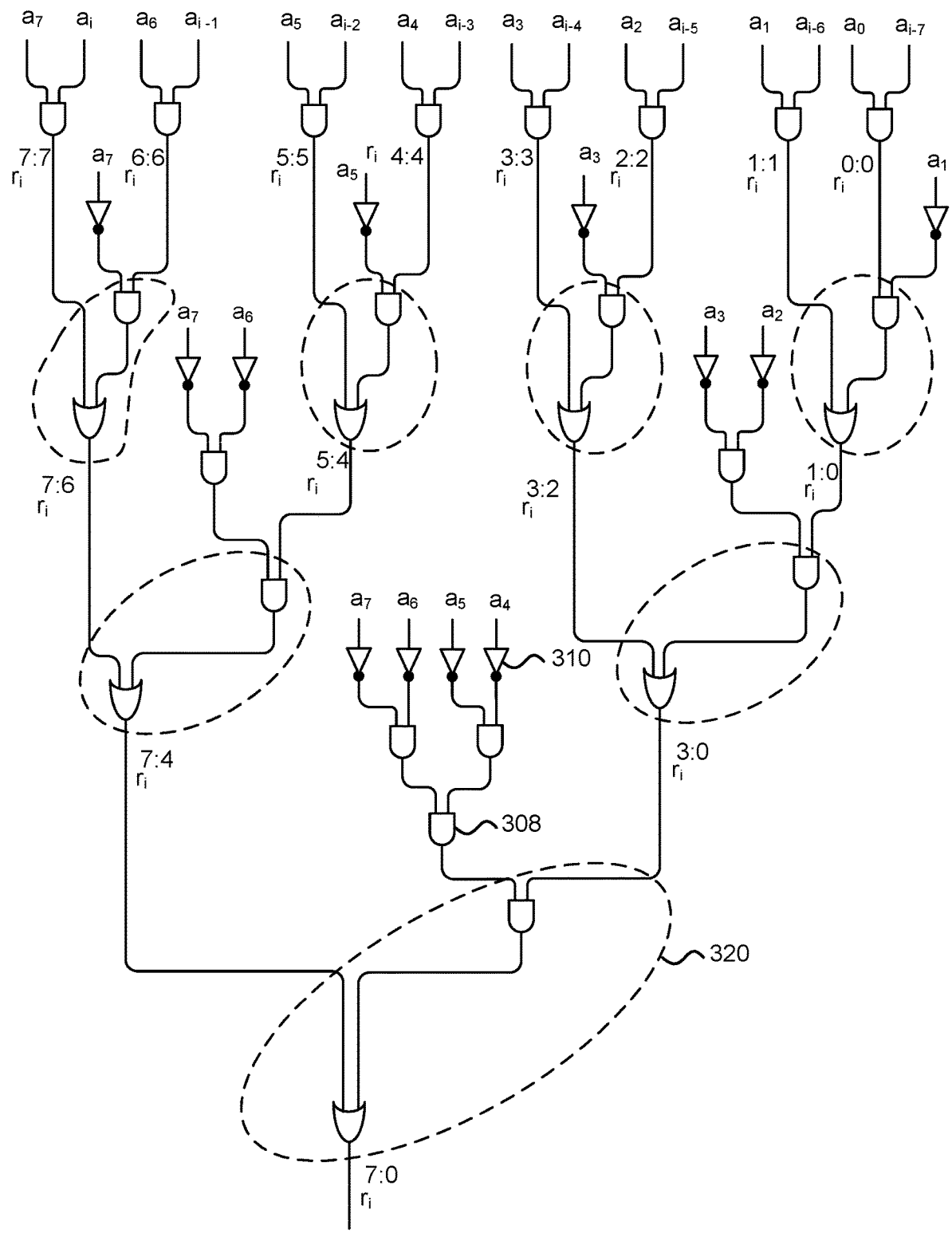
FIG. 5 shows an example arrangement of hardware logic which implement a renormaliser block.

As can be seen from FIG. 5, the value of $r_i^{7:0}$ can be calculated using a number of stages of hardware logic formed from AND gates 308, NOT gates 310 and AO21 logic functions 320. At the first stage, pairs of input bits are combined using AND gates and in subsequent stages, two or three input bits and/or outputs from a previous stage are combined using an AND gate (for 2 bits) or an AO21 logic function (for 3 bits). NOT gates are also used to invert values as appropriate, i.e. to generate $\overline{a_i}$ from $a_i$.

Figure 6A:
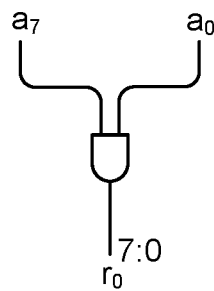
FIGS. 6A and 6B show two example arrangements of hardware logic within a renormaliser block arranged to calculate particular output bits.
Figure 6B:
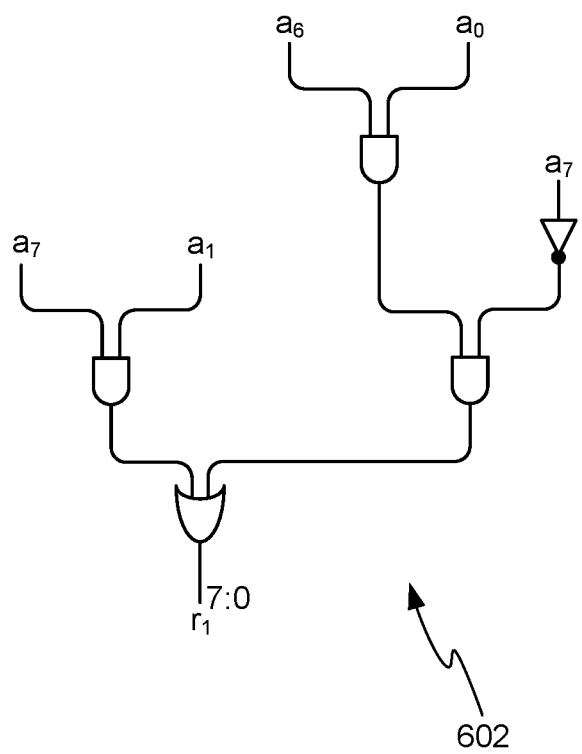

Not all of the logic arrangement shown in FIG. 5 is required for calculating all values of $r_u^{7:0}$ since for some values of i and x (where x can have a value between 1 and 7 in this example), the value of i−x may be negative and in which case the corresponding input bit $a_{i-x}$ can be replaced by 0 and so the corresponding parts of the logic tree can be omitted. For example, for i=6, $a_{i-7}$ can be replaced by 0 and so the hardware logic which calculates $r_i^{1:0}$ can be simplified to comprising a single AND gate which calculates $a_1.a_{i-6}=a_1.a_0$. For smaller values of i, more of the logic arrangement is omitted, such that for i=0 and i=1 the logic arrangements are as shown in FIG. 6, with the first arrangement 601 corresponding to i=0 and the second arrangement 602 corresponding to i=1. It can be seen that the hardware logic is considerately smaller than that shown in FIG. 5.

The logic arrangement for $r_i^{7:0}$ shown in FIG. 5 uses the recursion shown in equation (3) above. In other examples, the recursion shown in equation (5) may be used which results in the logic arrangement for $r_i^{7:0}$ shown in FIG. 7. As can be seen from FIG. 7, the value of $r_i^{7:0}$ can again be calculated using a number of stages of hardware logic formed from AND gates 308, OR gates 314, NOT gates 310 and OA22 logic functions 720. OA22 logic functions 720 combine two pairs of inputs using OR gates and then combine the outputs of the OR gates using an AND gate. It can be seen from FIG. 7 that the input $r_i^{j:t}$ branches to provide an input to both the OR gates in the OA22 logic function 720. In further examples, a combination of the recursions used in equations (3) and (5) may be used such that at some levels within the tree equation (3) is used and at other levels, equation (5) is used.

By building up the hardware logic using the recursion relation of equation (3) and/or (5) the delay is approximately proportional to log (i).

Figure 7:
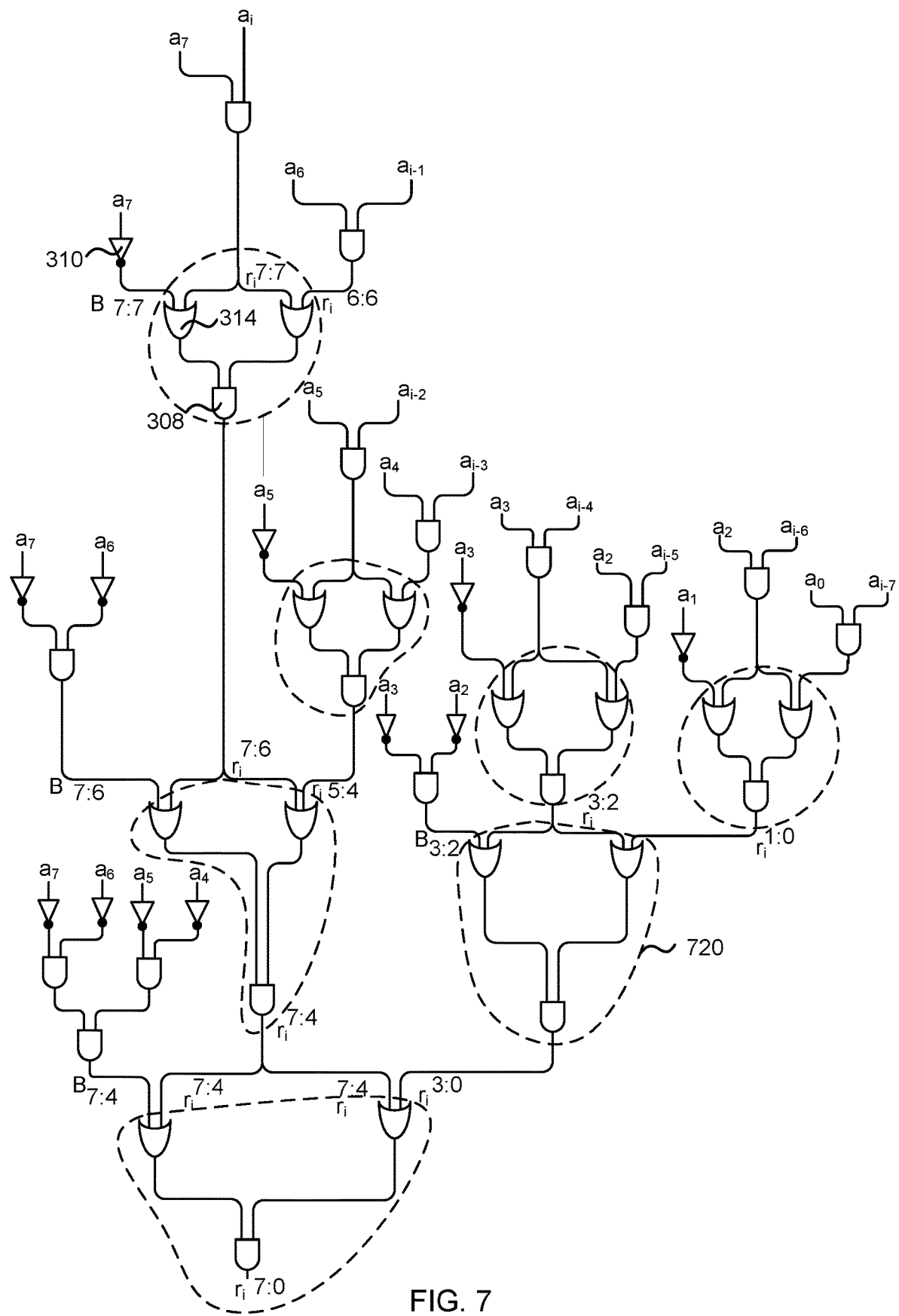
FIG. 7 shows a further example arrangement of hardware logic which implement a renormaliser block.

As described above with reference to FIG. 5, not all of the logic arrangement shown in FIG. 7 is required for calculating all values of $r_i^{7:0}$ since for some values of i and x (where x can have a value between 1 and 7 in this example), the value of i−x may be negative and in which case the corresponding input bit $a_{i-x}$ can be replaced by 0 and so the corresponding parts of the logic tree can be omitted.

In various examples separate hardware logic may be provided to calculate each of the $r_i$; however, as with the case of the LZC arrangements of hardware logic, the hardware logic for different n may be combined or overlaid such that values may be calculated only once and then used in multiple calculations of $r_i$, rather than a value being calculated independently many times within the hardware logic. In other examples, some values may still be calculated more than once, but values may be shared between logic arrangements.

By using the fully parallel implementation, as described above, it is possible to halve the delay in calculating outputs r and s compared to known methods of normalisation (e.g. as shown in FIG. 1).

The above detailed description relates to the first example 201 shown in FIG. 2 which is the fully parallel implementation (h=0). The same principles and equations may be used in the hybrid implementation, as shown in the second example 202, (1≤h<α); however, the hardware logic used for renormalisation (i.e. the left shifter 208 and renormalisation block 210) can be simplified as a result of receiving one or more bits (h bits) from the LZC 204. These hybrid implementations are described in detail below.

The LZC 204 in the hybrid implementation (like in the fully parallel implementation 201) may use any suitable method to compute the output, s, which is the number of leading zeros in the input number, a. In various examples, the LZC 204 may be implemented based on equation (1) for calculating the bits, $s_i$, of the output, s, of the LZC 204, and this implementation may be as described above with reference to the fully parallel implementation and shown in FIGS. 3 and 4. Unlike in the fully parallel implementation, in the hybrid implementations, one or more of the MSBs of the LZC output (but not all bits of the LZC output) are provided to a left shifter 208 which may be implemented using a multiplexer. In any hybrid implementation, h bits are output by the LZC 204 to the left shifter 208 where 1≤h<α. Where n is a power of 2 (i.e. n=$2^y$ where y is a natural number) the value of h used in a hybrid implementation may be selected to be greater than one in order that the amount of logic in the renormaliser is reduced compared to the fully parallel (h=0) known solution (as shown in FIG. 1).

The left shifter 208 receives the h-bits from the LZC 204 and left shifts the input number a by the number of places indicated by the received bits. The left shifter 208 may, for example, be implemented using a multiplexer. It will be appreciated that as the left shifter 208 only receives one or more, but not all, the output bits from the LZC 204, there may still be one or more leading zeros in the output from the left shifter 208. For example, for a 3-bit LZC if a single MSB equal to one is received by the left shifter (h=1), then the left shifter shifts the input number by $2^2$ bits to the left. However, if the single MSB in this example that is received is equal to zero, no left shifting is performed in the left shifter 208. In either case, the output from the left shifter 208 has a maximum of 3 leading zeros as the two LSBs of the LZC are unknown.

The renormaliser block 210 in a hybrid implementation calculates the normalised output, r, with some input from the LZC 204 (i.e. a subset of the bits, starting with the MSB) but without receiving the full output s from the LZC, as shown in FIG. 2. In various examples, the renormaliser block 210 may be implemented based on the following equation for calculating the bits, $r_j$, of the output, r, of the renormaliser block 210:

$$r_j = A'_{n-1,j} + \Sigma_{k=1}^{MIN(j, 2^{\alpha-h}-1)} B'_{n-1:n-k} A'_{n-k-1, j-k} \qquad (6)$$

Where:
a' is the output of the left shifter 208

$$A'_{\beta,\gamma} = a'_\beta . a'_\gamma$$

$$B'_{\beta:\gamma} = \overline{a'_\beta} . \overline{a'_{\beta-1}} \ldots \overline{a'_{\gamma+1}} . \overline{a'_\gamma}$$

$$a' = a << (s_{\alpha-1} 2^{\alpha-1} + \ldots + s_{\alpha-h} 2^{\alpha-h})$$

Considering the same example as previously where n=8, but this time using the hybrid approach with h=2, the 8 bits calculated by the renormaliser block are as follows:

$$r_0 = A'_{7,0}$$

$$r_1 = A'_{7,1} + B'_{7:7} A'_{6,0}$$

$$r_2 = A'_{7,2} + B'_{7:7} A'_{6,1} + B'_{7:6} A'_{5,0}$$

$$r_3 = A'_{7,3} + B'_{7:7} A'_{6,2} + B'_{7:6} A'_{5,1} + B'_{7:5} A'_{4,0}$$

$$r_4 = A'_{7,4} + B'_{7:7} A'_{6,3} + B'_{7:6} A'_{5,2} + B'_{7:5} A'_{4,1}$$

$$r_5 = A'_{7,5} + B'_{7:7} A'_{6,4} + B'_{7:6} A'_{5,3} + B'_{7:5} A'_{4,2}$$

$$r_6 = A'_{7,6} + B'_{7:7} A'_{6,5} + B'_{7:6} A'_{5,4} + B'_{7:5} A'_{4,3}$$

$$r_7 = A'_{7,7} + B'_{7:7} A'_{6,6} + B'_{7:6} A'_{5,5} + B'_{7:5} A'_{4,4} = \overline{B_{7:4}}$$

And these may be expanded and implemented in arrangements of OR, AND, NOT and AO21 logic functions in a similar manner to those described above with reference to FIGS. 3 and 4. In calculating the values of $r_j$, again pairs of input bits are combined in the first stage and then groups of 2 or 3 outputs of each stage are combined in subsequent stages (e.g. where the AO21 logic function is used to combine 3 outputs).

It can be seen by comparing these equations to those above for the fully parallel version, that by using the hybrid approach with h=2, the equations are truncated such that the equation for $r_4$ is missing the last term, the equation for $r_5$ is missing the last two terms, the equation for $r_6$ is missing the last three terms and the equation for $r_7$ is missing the last four terms. These terms can be discounted because the information provided by the bits received from the LZC narrows down the possible positions of the leading one.

In a similar manner to equation (2), equation (6) can also be simplified by re-writing it in the form of a recursion relation (e.g. as shown in equations (3)-(5) above), however it is only necessary to construct $r_i^{n-1:n-2^{\alpha-h}}$ since it is known (as a result of the bits received from the LZC 204) that the leading 1 occurs in a'[n−1:n−$2^{\alpha-h}$] or a'=0.

Figure 8A:
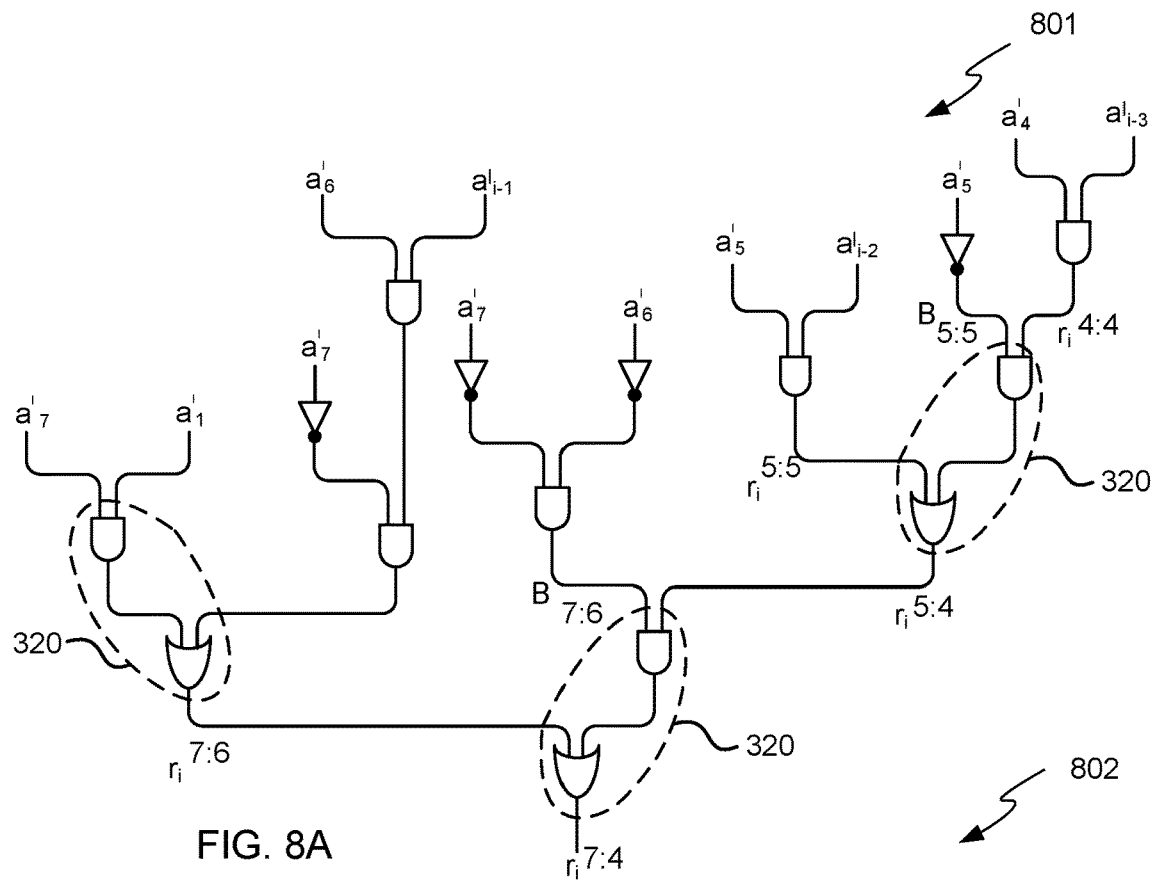
FIGS. 8A and 8B show two example arrangements of hardware logic which implement a renormaliser block in a hybrid implementation.
Figure 8B:
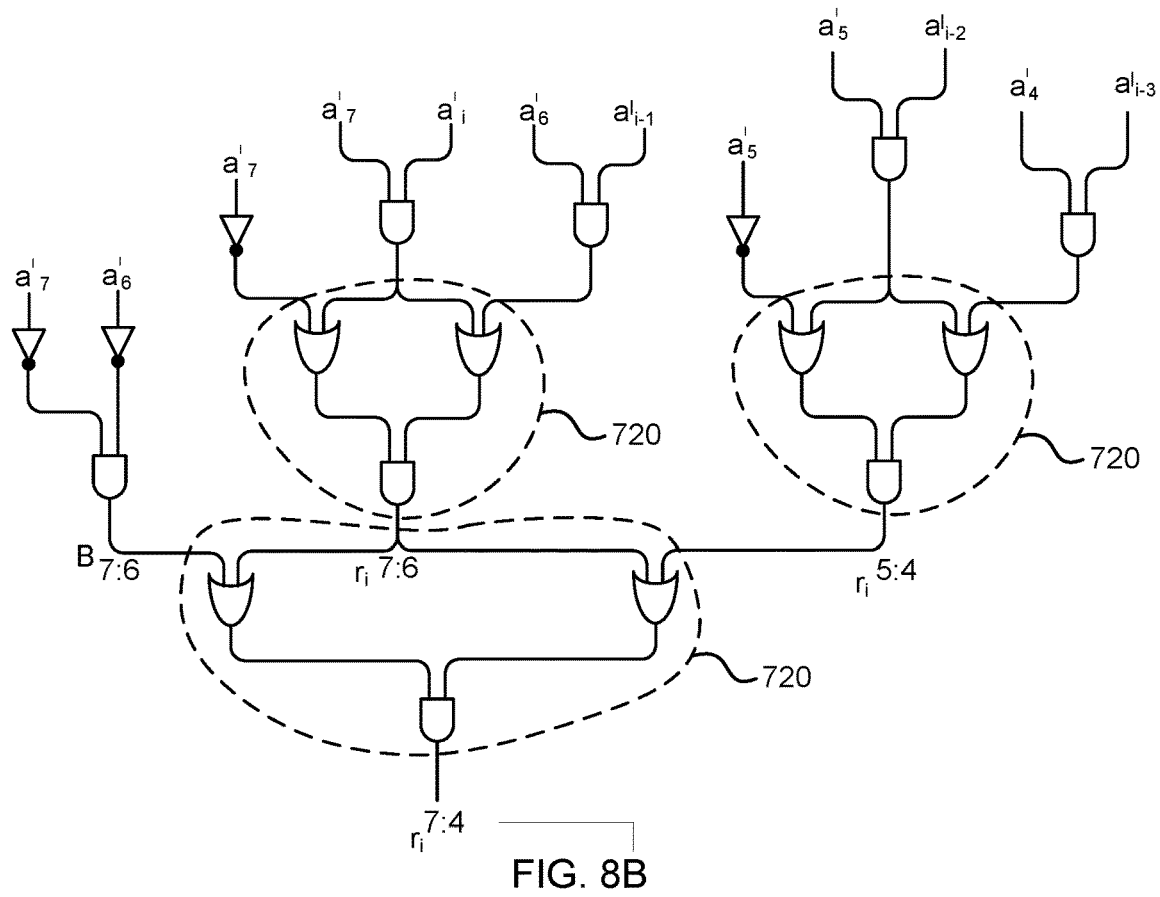

As described above with reference to the fully parallel version, starting from $r_i^{j:j}=A_{j,j-n+1+i}$, $r_i^{n-1:n-2^{\alpha-h}}$ can be constructed in [$\log_2(i+1)$] steps using a recursion relation (e.g. equation (3) or (5)) to form $r_i^{j:k}$ for larger and larger intervals of [j,k] and $B_{j:k}$ can be constructed logarithmically using an AND tree. Two examples of this for the previously described example, i.e. for n=8, α=4 and h=2, are shown in FIG. 8. For this example it is only necessary to construct $r_i^{7:4}$ and the first example 801 uses the recursion shown in equation (3) above whilst the second example 802 uses the recursion shown in equation (5) above. The reduction in hardware logic required in the renormaliser block 210 where a hybrid implementation is used can clearly be seen by comparing the first example 801 in FIG. 8 and FIG. 5 (which shows the fully parallel equivalent implementation) and by comparing the second example 802 in FIG. 8 and FIG. 7 (which again shows the fully parallel equivalent implementation). In further examples (not shown in FIG. 8), a combination of the recursions used in equations (3) and (5) may alternatively be used such that at some levels within the tree equation (3) is used and at other levels, equation (5) is used.

As described above with reference to FIGS. 5 and 7, not all of the logic arrangement shown in either example in FIG. 8 is required for calculating all values of $r_i^{7:4}$ since for some values of i, the input bit $a_{i-x}$ (where in this case x can have a value of 1 or 2 or 3) will be replaced by zero and so the corresponding parts of the logic tree can be omitted.

Using the methods described above, the LSBs of output r are output from the renormaliser block 210 significantly quicker than in known normalisers. As the value of h decreases, the size of the renormaliser block 210 increases and the size of the left shifter 208 decreases (at a slower rate). The critical delay (i.e. the delay of the slowest signal from input to output of the component) does not change significantly as h is varied.

In some instances where the LSBs of r are output ahead of remaining bits of r, these LSBs may be processed by further logic (e.g. input to a rounding process) ahead of the output of the rest of r.

In comparison to the hybrid implementations, the fully parallel implementation described above is larger in size, but is significantly faster to calculate the final outputs (i.e. all of r and s), with the delay expected to be about ½ to ⅔ of the delay of known renormalisers. However, use of a hybrid approach provides design flexibility (i.e. to trade off size of hardware logic and speed of output of the LSBs of r).

FIGS. 3-8 which are described above show specific arrangements of logic gates (in particular AND, OR and NOT gates and AND-OR and OR-AND logic functions). It will be appreciated that there may be alternative arrangements of logic gates which achieve the same logic functions as those shown.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. Hardware logic arranged to normalize or renormalize a binary number, the hardware logic comprising:
    a zero counter arranged to count leading or trailing zeros in the binary number; and
    a shifter arranged to shift the binary number;
wherein at least a portion of the shift is performed in parallel with the count.

2. Hardware logic according to claim 1, wherein all of the shift is performed in parallel with the count.

3. Hardware logic according to claim 1, wherein the shifter comprises a normalizer block arranged to operate independently of the zero counter.

4. Hardware logic according to claim 3, wherein the normalizer block comprises hardware logic arranged to combine pairs of bits in the binary number according to:

$$r_i^{j,j} = a_j . a_{j-n+1+i}$$

where:
. represents an AND logic function,
n is a number of bits in the binary number,
j is a bit index associated with each of the n-bits in the binary number,
$a_j$ is the $j^{th}$ bit in the binary number, and
i is a bit index associated with each bit $r_i$ output by the normalizer block.

5. Hardware logic according to claim 4, wherein the normalizer block further comprises hardware logic arranged to combine values $r_i^{j,j}$ in the form of a tree of logic elements to compute output bits $r_i^{n-1:0}$ based on at least one of:

$$r_i^{j,k} = r_i^{j,t} + B_{j,t} . r_i^{t-1:k} \text{ and}$$

$$r_i^{j,k} = (r_i^{j,t} + B_{j,t})(r_i^{j,t} + r_i^{t-1:k})$$

where:
+ represents an OR logic function,
t and k are natural numbers, and
$B_{j:t} = \overline{a_j} . \overline{a_{j-1}} \ldots \overline{a_{t+1}} . \overline{a_t}$.

6. Hardware logic according to claim 1, wherein the shifter is arranged to receive a subset of the bits, starting from a most significant bit, generated by the zero counter and to shift the binary number based on the received bits.

7. Hardware logic according to claim 6, further comprising:
    a normalizer block arranged to receive an output from the shifter and to generate an output comprising a normalised or renormalized version of the binary number.

8. Hardware logic according to claim 7, wherein the normalizer block comprises hardware logic arranged to combine pairs of input bits according to:

$$r_i^{j,j} = a'_j . a'_{j-n+1+i}$$

where:
. represents an AND logic function,
n is a number of bits in the binary number,
j is a bit index associated with each of the n-bits in the binary number,
$a'_j$ is the $j^{th}$ bit in the number output by the shifter, and
i is a bit index associated with each bit r output by the normalizer block.

9. Hardware logic according to claim 8, wherein the normalizer block further comprises hardware logic arranged to combine values $r_i^{j,j}$ in the form of a tree of logic elements to compute output bits $r_i^{n-1:n+1-2^{\alpha-h}}$ based on at least one of:

$$r_i^{j,k} = r_i^{j,t} + B_{j,t} . r_i^{t-1:k} \text{ and}$$

$$r_i^{j,k} = (r_i^{j,t} + B_{j,t})(r_i^{j,t} + r_i^{t-1:k})$$

where:
+ represents an OR logic function,
t and k are natural numbers,
$\alpha = \lfloor \log_2 n \rfloor + 1$,
the subset of bits received from the zero counter comprises h bits, and
$B_{j:t} = \overline{a_j} . \overline{a_{j-1}} \ldots \overline{a_{t+1}} . \overline{a_t}$.

10. A method of normalizing or renormalizing a binary number by using hardware logic having a counter and a shifter, the method comprising:
    counting, with the counter of the hardware logic, leading or trailing zeros in the binary number; and
    shifting, with the shifter of the hardware logic, the binary number, and wherein at least a portion of the shifting is performed in parallel with the counting.

11. A method according to claim 10, wherein all of the shifting is performed in parallel with the counting.

12. A non-transitory computer readable storage medium having stored thereon computer executable program code that when executed causes at least one processor comprising hardware logic having a counter and a shifter to
    count, with the counter of the hardware logic, leading or trailing zeros in a binary number; and
    shift, with the shifter of the hardware logic, the binary number, wherein at least a portion of the shift is performed in parallel with the count.

13. A non-transitory computer readable storage medium according to claim 12, wherein all of the shift is performed in parallel with the count.

\* \* \* \* \*